May 4, 1926.
C. W. CARTER
1,583,574
LIQUID FLOW MEASURING DEVICE
Filed March 5, 1924    2 Sheets-Sheet 2
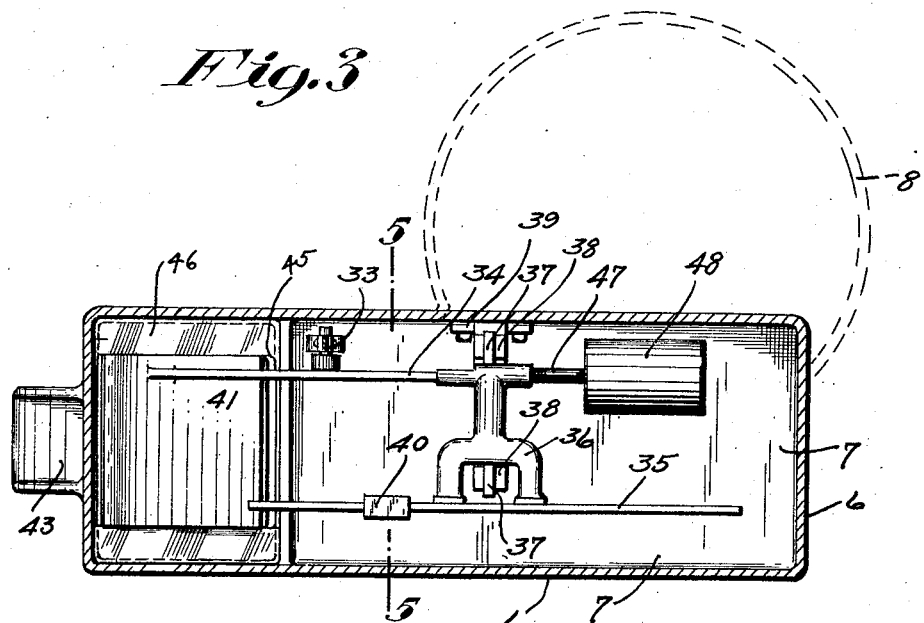
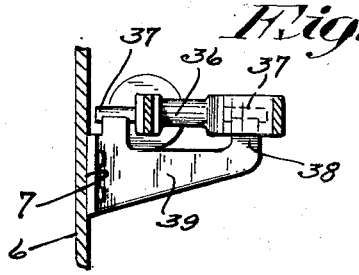
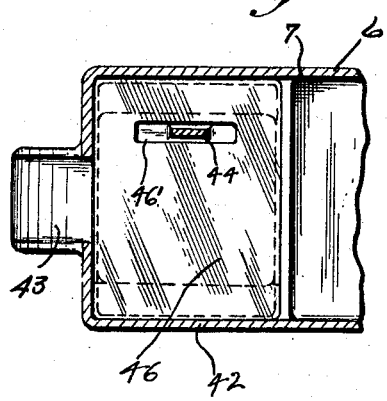
Inventor
Clarence W. Carter
By his Attorneys Patented May 4, 1926.

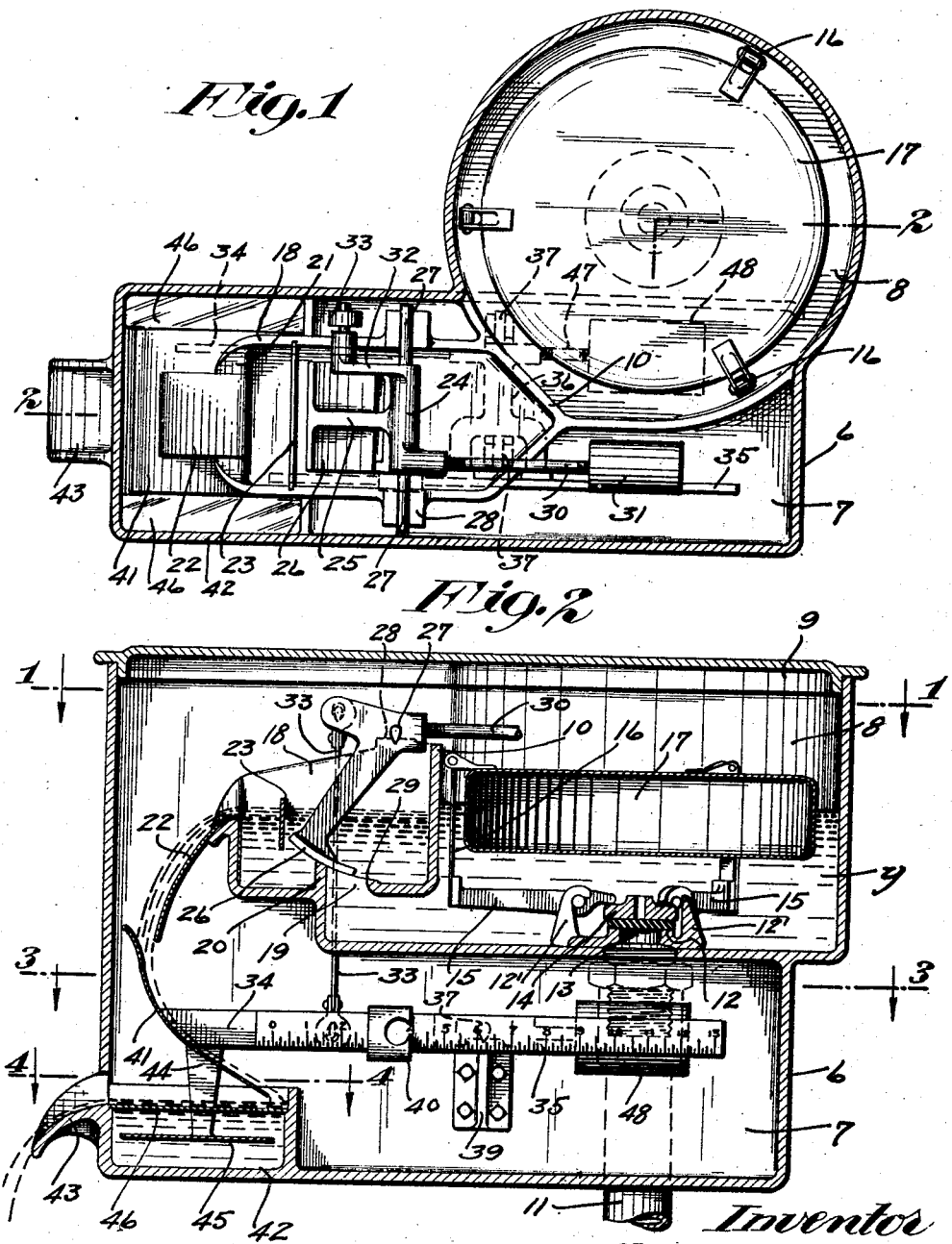

1,583,574

UNITED STATES PATENT OFFICE.

CLARENCE W. CARTER, OF MINNEAPOLIS, MINNESOTA.

LIQUID-FLOW-MEASURING DEVICE.

Application filed March 5, 1924. Serial No. 697,034.

*To all whom it may concern:*

Be it known that I, CLARENCE W. CARTER, a citizen of the United States, residing at Minneapolis, in the county of Hennepin and State of Minnesota, have invented certain new and useful Improvements in Liquid-Flow-Measuring Devices; and I do hereby declare the following to be a full, clear, and exact description of the invention, such as will enable others skilled in the art to which it appertains to make and use the same.

My invention provides an extremely simple and highly efficient machine for very accurately regulating the flow of liquids in units of measure per units of time. The device is, therefore, in a sense, a liquid flow measuring device. Several of such devices are well adapted for use as percentage feeders for commingling or producing blends of different liquids. Also, one of my improved liquid flow regulators is well adapted for use as a moisture-supplying device in connection with a feed regulator or percentage feeder such as used for controlling the flow of grain.

Hitherto, various devices have been provided for controlling the flow of finely divided solids, such as grain and the like, but such devices have not been found efficient or even practically operative for controlling the flow of liquids. The accurate control of the flow of liquids presents certain requirements not met by the earlier types of devices for the control of grain and the like, but all of which requirements are effectually met by this improved liquid flow regulator. The important features involved in this improved machine will be better understood after having first described in detail the commercial embodiment thereof illustrated in the accompanying drawings, wherein like characters indicate like parts throughout the several views.

Referring to the drawings:

Fig. 1 is a horizontal section taken through the complete liquid flow regulator on the line 1—1 of Fig. 2;

Fig. 2 is a vertical section taken approximately on the irregular line 2—2 of Fig. 1 with some parts shown in full and some parts broken away;

Fig. 3 is a horizontal section on the line 3—3 of Fig. 2;

Fig. 4 is a fragmentary horizontal section on the line 4—4 of Fig. 2; and

Fig. 5 is a detail in transverse vertical section taken approximately on the line 5—5 of Fig. 3.

All of the moving parts of the device are located within a suitable casing, preferably a cast iron shell 6, formed into two main compartments 7 and 8 and preferably provided with a removable cover 9. The compartment 7 is a substantially rectangular structure and the compartment 8 is a substantially cylindrical structure that is set partway into one side of the compartment 7 but projects laterally therefrom, so that its axis is offset from one side of said compartment 7. That portion of the compartment 8 that is within the compartment 7 is formed with an upstanding segmental wall 10 that terminates below the top of the shell and converts said compartment 8 into what may be designated as a combined water supply compartment and float chamber. A water or liquid supply pipe 11 extends upward and is connected axially through the bottom of the compartment 8 and delivers to a valve seat 12 secured on the bottom of said compartment 8 and having a supply port 13. The port 13 is adapted to be closed by a valve 14 arranged to be depressed onto said seat under the action of levers 15 fulcrumed to lugs 12' of the valve seat 12 and connected at their outer ends by straps or links 16 to a float 17. The float 17 is preferably a hollow sheet metal shell of short cylindrical form and, as will presently be noted, it operates to maintain an approximately constant level of water or liquid within the compartment 8.

Within the upper portion of the compartment 7, the compartment 8 is formed with an extension that provides a water or liquid delivery chamber or compartment 18. The chamber 18 is connected to the compartment 8 through a submerged port 19. Here it may be noted that the wall 10 serves as a partition wall between the compartment 8 and the chamber 18 and that the port 19 is formed between a forwardly extended portion of the wall 10 on the bottom of the chamber 18. As an important feature of this invention, it will be noted that the water delivery chamber 18 is formed with an overflow passage 21 that is located but slightly below the level of the water or liquid $y$ contained within the supply compartment 8, so that the water delivered through the overflow passage 21 will be discharged under a very slight head and under very low pressure. In fact, the altitudes of the liquid in the chambers 8 and 18 will be so nearly the same that there will be but a very slight pressure tending to produce flow through the port 19; but this important matter will be later given further consideration.

The overflow port 21 is shown as provided with a slightly curved water-flow-guiding plate 22. The numeral 23 indicates a transverse baffle plate applied in the chamber 18 between the port 19 and overflow passage 21 and extended somewhat above and below the water level so as to prevent direct surface currents and to deflect the flow of liquid on its way to the overflow passage.

For controlling the flow of water or liquid through the feed port 19, I provide a valve, preferably of the oscillatory type, the same as shown comprising a sleeve-like hub 24, a radially projecting arm 25, and a segmental valve plate 26, the latter being at the free end of said arm, and the hub 24 having axially projecting knife-edged fulcrums 27. The knife-edged fulcrums 27 are seated on notched bearings 28 formed on the upper edges of the sides of the liquid delivery chamber 18 and the lower convex surface of the valve plate 26 is arranged to very closely but freely engage with a concave cylindrical valve seat 29 formed at the upper extremity of the passage 19. At one end, the hub 24 is provided with a rearwardly extended arm in the form of a rod 30 provided at its free end with a counterweight 31 that is made axially adjustable by threaded engagement. At its other end, the hub 24 is provided with a forwardly projecting arm 32, which, by a link 33, is connected to the forwardly projecting end of a beam 34. The beam 34 and another beam 35, herein designated as a scale beam, are rigidly connected to a common frame 36 that forms a common support for the two beams and is provided with axially spaced knife-edged fulcrums 37 resting on fulcrum seats 38 of a fulcrum bracket 39, (see Figs. 3 and 5), rigidly secured to one side of the shell of the compartment 7. The scale beam 35 extends on both sides of its fulcrum and is provided with a slidably adjustable weight 40. Also, the scale beam 35 is graduated to indicate units of liquid measure. It may be thus graduated in accordance with any system of measurement to indicate units of flow per unit of time. Located within the line of flow from the overflow passage 21 and plate 22 is a so-called impact plate, which, in one way or another, is connected to move with the scale beam. As shown, this impact plate is a thin obliquely set plate 41 that is rigidly connected to the front end of the beam 34. The plate 41, for convenience, is designated as an impact plate, because there will be some impact due to the falling water thereon, but the regulating action is due to probably as much to the weight of water or liquid running on said plate as it is to direct impact.

In some arrangements, the water or liquid would be discharged directly from the impact plate 41 onto the material or into the receptacle that is to receive the same, but in the preferred arrangement, the liquid running from the said plate 41 will be caught by a secondary delivery chamber 42 formed on the bottom of the compartment 7 and provided with a secondary overflow passage 43. In this arrangement, the chamber 42 will contain a considerable quantity of liquid and, hence, may be used as a dash pot. As a stabilizer for preventing vibrations or quick movements of the scale beam, the beam 34, at its front end, is shown as provided with a depending arm 44, which, at its lower end, has a dash plate 45 working in the liquid of the chamber 42 below a horizontal baffle plate 46, which latter is supported in the chamber 42 considerably above the plate 45 and slightly below the liquid level of said chamber.

As a counterbalance to the impact plate 41, the arm 44 and dash plate 45, the fulcrum frame 36 is shown as provided with a rearwardly extended arm in the form of a rod 47 having a weight 48 made axially adjustable by screw-threaded engagement therewith.

The baffle plate 46 prevents the agitation of the water in the chamber 42 under vertical movements of the dash plate 45 from changing or interfering with the steady flow of water through the overflow passage 43.

It should be noted that the baffle plate 46 has a quite large perforation 46' through which the depending arm 44 works freely. This passage permits water to flow slowly but not to splash from the upper to the lower side of said plate 46.

*Operation.*

The adjustment of the counterbalancing weights 31 and 48 should be such that when the scale weight 40 is set at the zero mark on the scale beam 35, the valve 26 will be positioned so that it just closes the port 19 and, of course, when said valve is thus adjusted, there will be practically no flow of the water or liquid from the device. The float will automatically maintain a substantially constant level of the water in the supply compartment 8, regardless of whether or not there is a discharge of water or liquid from the apparatus through the overflow passage 21. The valve 26 may be fitted to the seat 29 so that it will work with a clearance of only a few thousandths of an inch, and the slight head will produce such light pressure that it will not overcome the friction and capillary attraction between the valve and seat. Hence, for all intents and purposes, this valve and seat will be liquid-tight. These are advantages obtained by submerging the valve and the valve seat within the liquid.

When the scale beam weight 40 is adjusted at any particular position on the scale beam toward the right from its zero position in respect to the drawings, the right-hand end of the scale beam will be lowered and the valve 26 will be moved into an open position, which will give the predetermined desired flow of water or liquid in units of measure per unit of time, that is, said valve will be adjusted to such position as soon as the overflowing water or liquid becomes active on the impact plate 41. If the valve should happen to move to a position which gives greater flow than that indicated by the setting of the weight on the scale beam, then the left-hand end of the scale beam and the impact plate will be slightly lowered, thereby moving the valve 26 toward its closed position far enough to correct or to provide the predetermined flow, and, of course, the converse of this statement is true. The secondary delivery chamber 42 will be kept filled with the water or liquid and, as already stated, the piston-acting dash plate 45 will prevent sudden vibrations or quick movements of the scale beam, impact plate and controlling valve.

The above is a description of a commercial device embodying my invention and especially designed for controlling the flow of water, for the dampening of grain, or for some similar purpose, but it will, of course, be understood that the device may be modified in its details of construction and arrangements of parts to adapt the same for the feeding of various other liquids, and all within the scope of my invention as herein disclosed and claimed.

What I claim is:

1. A liquid flow regulator comprising a liquid container having an overflow passage, a scale beam having an impact plate positioned in the path of the liquid flow from said overflow passage, means for maintaining a predetermined altitude of liquid within said container, and a valve operated by said scale beam and controlling the flow of liquid through said overflow passage.

2. A liquid flow regulator comprising a liquid container having an overflow passage, a scale beam having an impact plate positioned in the path of the liquid flow from said overflow passage, means for automatically maintaining a substantially constant altitude of liquid within said container at an altitude but slightly above the overflow line of said overflow passage, and a valve operated by said scale beam and controlling the flow of liquid through said overflow passage.

3. A liquid flow regulator comprising a liquid container, a float-controlled valve for maintaining a substantially constant level of liquid in said container, said container having an overflow passage located but slightly below the level of the liquid maintained in said container, a scale beam having an impact plate positioned in the path of flow of liquid from said overflow passage, a valve for controlling the flow of liquid from said container to said overflow passage, and a connection between said scale beam and valve for moving said valve in accordance with the counterpoise of said scale beam.

4. A liquid flow regulator comprising a container divided into supply and delivery compartments connected by a submerged port, said delivery compartment having an overflow passage located below the level of the liquid in said supply compartment, a submerged valve cooperating with said submerged port, and an adjustably poised scale beam having an impact plate positioned in the path of the liquid flow from said overflow passage.

5. The structure defined in claim 4 in further combination with a float-actuated inlet valve controlling the supply of liquid to said supply compartment and maintaining a level of liquid that is but slightly above the overflow line of said overflow passage.

6. A liquid flow regulator comprising a container divided into supply and delivery compartments connected by a submerged port, said delivery compartment having an overflowing passage located at a materially higher level than said submerged port, means for automatically maintaining a substantially constant level of liquid within said supply compartment at an altitude but slightly above the overflow line of said overflow passage, and a variably counterpoised scale beam, an impact plate connected to said scale beam and positioned in the path of flow of the liquid from said overflow passage, a submerged valve cooperating with said submerged port, and a connection for operating said valve from said scale beam.

7. The structure defined in claim 1 in which said valve is of segmental cylindrical form and is fulcrumed above the liquid level of said container.

8. The structure defined in claim 4 in which said valve is of segmental cylindrical form and is fulcrumed above the liquid level of said container.

9. The structure defined in claim 1 in which said valve is of segmental cylindrical form and is fulcrumed above the liquid level of said container, said valve having an adjustable counterweight.

10. The structure defined in claim 4 in which said valve is of segmental cylindrical form and is fulcrumed above the liquid level of said container, said valve and said scale beam having independently adjustable counterweights.

11. A liquid flow regulator comprising a liquid container having a discharge passage, a valve controlling the flow of liquid from said container, a variably counterpoised scale beam having a connection for operating said valve and provided with an impact plate positioned in the path of flow from said container, a secondary liquid receptacle having an overflow passage and arranged to receive the liquid from said impact plate, and a dash plate submerged in the liquid in said latter noted container and connected to said scale beam and serving as a retarding device.

12. The structure defined in claim 1 in further combination with a secondary liquid receptacle positioned to receive the liquid from said impact plate and having an overflow passage, and a dash-acting element submerged in the liquid of said secondary container and connected to move with said scale beam.

13. The structure defined in claim 1 in which said valve is provided with an adjustable counterweight and in which said scale beam is provided with a sliding weight and with an independently adjustable counterposing weight.

14. The structure defined in claim 2 in which the automatic means for maintaining a constant altitude of liquid within the container is a float-actuated valve controlling a port opening through the bottom of said container.

In testimony whereof I affix my signature.

CLARENCE W. CARTER.